Figure 1:
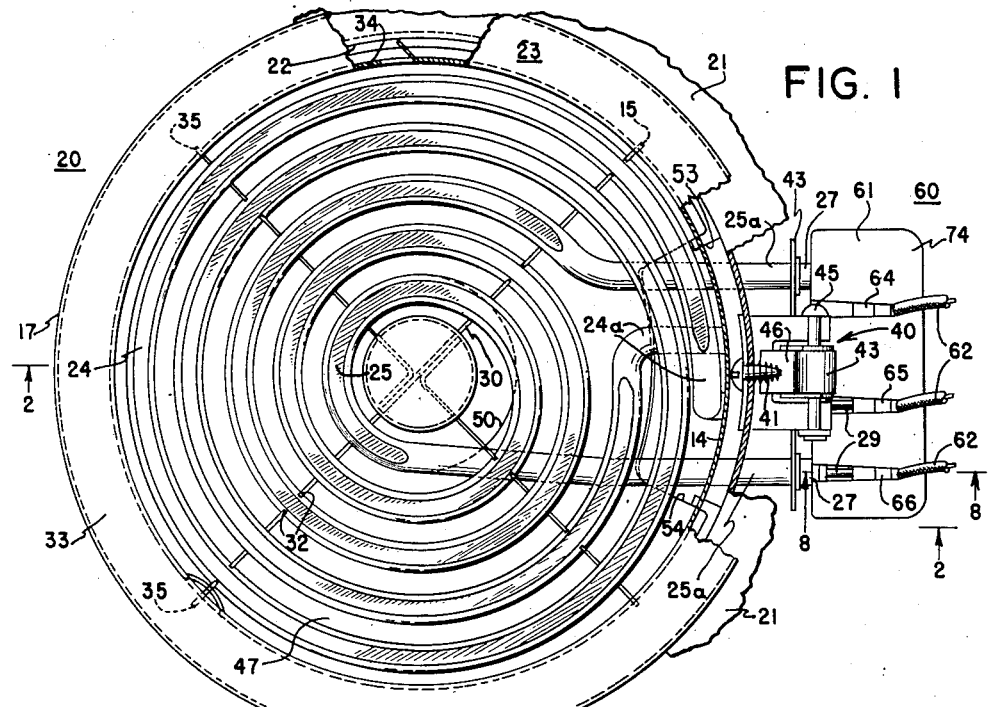

April 3, 1951 R. J. SUTTON 2,547,058
ELECTRIC TERMINAL STRUCTURE
Filed April 14, 1949 2 Sheets-Sheet 1

*INVENTOR.*
ROBERT J. SUTTON
BY
Smith, Olsen & Baird
ATTYS.

April 3, 1951    R. J. SUTTON    2,547,058
ELECTRIC TERMINAL STRUCTURE
Filed April 14, 1949    2 Sheets-Sheet 2

INVENTOR.
ROBERT J. SUTTON
BY
Smith, Olsen & Baird
ATTYS.

Patented Apr. 3, 1951

2,547,058

UNITED STATES PATENT OFFICE 2,547,058

ELECTRIC TERMINAL STRUCTURE

Robert J. Sutton, Chicago, Ill., assignor to Hotpoint Inc., a corporation of New York Application April 14, 1949, Serial No. 87,516

9 Claims. (Cl. 173—328)

The present invention relates to electric terminal structures.

Electric heating appliances, such as electric ranges frequently comprise movable hot plates provided with heating units having terminals that are connected to flexible insulated wires, the connections being enclosed by insulating terminal blocks to prevent short-circuits. Ordinarily, the ends of each set of insulated wires are bared and secured to the associated set of terminals of the corresponding heating unit in insulated relation by a set of screws, or the like, since the heating unit draws considerable current rendering necessary good electrical connections. Also, the terminal block enclosing a set of connections is ordinarily split longitudinally, the two cooperating sections of the terminal block being assembled about the set of connections after they have been made and then secured in place by a set of screws, or the like, whereby the set of connections is clamped in place between the two sections of the terminal block.

While this terminal structure is quite satisfactory in service, it is more expensive both to manufacture and to assemble into a heating appliance than is desirable.

Accordingly, it is a general object of the present invention to provide in an electric heating appliance, an improved terminal structure of simple and rugged construction that is economical both to manufacture and to assemble into the appliance.

Another object of the invention is to provide an improved electric terminal structure that may be readily assembled, without requiring separate screws or other fixtures either for the purpose of completing the electrical connections between the set of terminals and the set of insulated wires or for the purpose of holding the insulating terminal block in place about the connections.

Another object of the invention is to provide an improved electric terminal structure including a one-piece hollow insulating quick-attachable terminal block that produces good electrical connections between the set of terminals and the set of insulated wires and prevents stress upon the electrical connections in the event of relative movement between the set of terminals and the set of insulated wires.

A further object of the invention is to provide an electric terminal structure of the type noted that includes resilient clips rigidly secured to the set of terminals and frictionally engaging or clamping the set of wires, and wherein the clips are restrained in their clamping positions by the mere placement of the insulating terminal block thereupon.

Further features of the invention pertain to the particular arrangement of the elements of the terminal structure, whereby the above-outlined and additional operating features thereof are attained.

Figure 2:
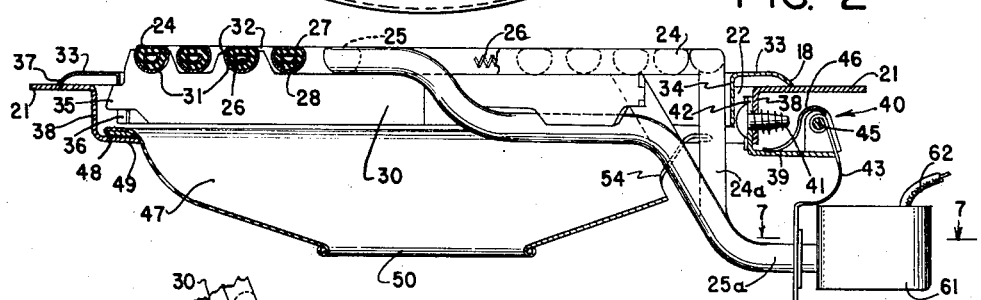
Figure 4:
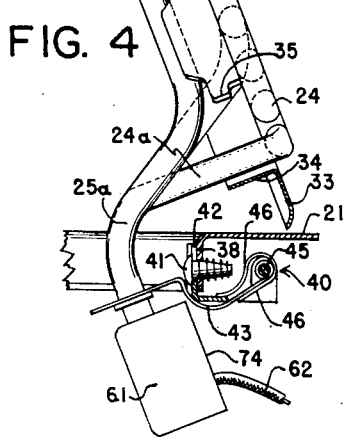
Figure 3:
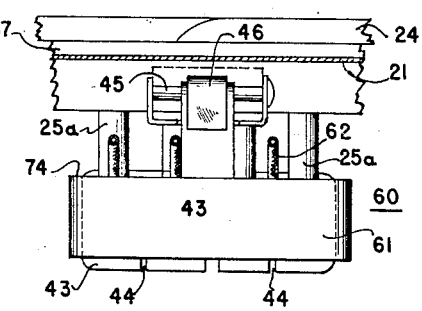
Figure 5:
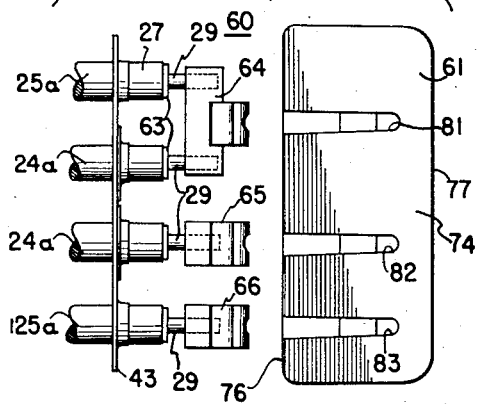
Figure 7:
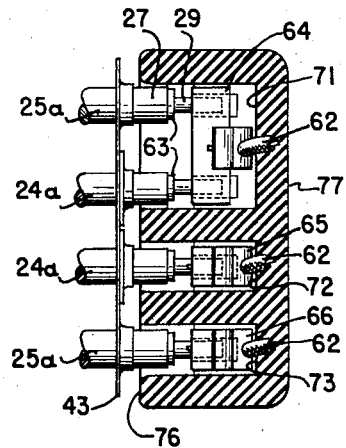
Figure 6:
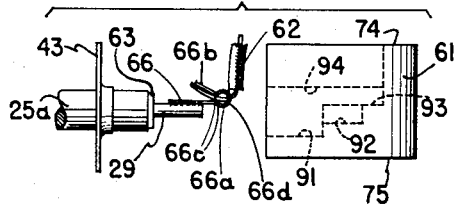
Figure 8:
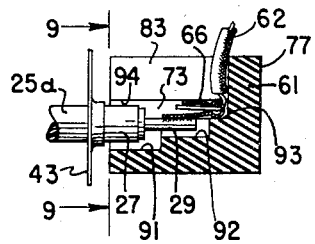
Figure 9:
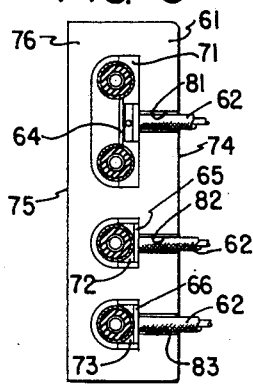
Figure 10:
Figure 11:
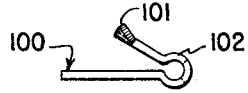

The invention, both as to its organization and method of operation, together with further objects and advantages thereof, will best be understood by reference to the following specification taken in connection with the accompanying drawings, in which Figure 1 is a plan view, partly broken away, of an electric heating appliance incorporating a terminal structure embodying the present invention; Fig. 2 is a vertical sectional view of the electric heating appliance, taken in the direction of the arrows along the offset line 2—2 in Fig. 1; Fig. 3 is a fragmentary end elevational view of the electric heating appliance shown in Fig. 1; Fig. 4 is a fragmentary vertical sectional view of the electric heating appliance, similar to Fig. 2, illustrating the raised position thereof; Fig. 5 is an enlarged exploded plan view of the terminal structure incorporated in the electric heating appliance prior to assembly thereof; Fig. 6 is an enlarged exploded side elevational view of the terminal structure prior to assembly thereof; Fig. 7 is an enlarged horizontal sectional view of the terminal structure, taken in the direction of the arrows along the line 7—7 in Fig. 2; Fig. 8 is an enlarged vertical sectional view of the terminal structure, taken in the direction of the arrows along the line 8—8 in Fig. 1; Fig. 9 is an enlarged vertical sectional view of the terminal structure, taken in the direction of the arrows along the line 9—9 in Fig. 8; Fig. 10 is a greatly enlarged plan view of one of the clips incorporated in the terminal structure, illustrating a modification in the structure thereof; and Fig. 11 is a greatly enlarged side elevational view of the clip shown in Fig. 10.

Referring now to Figs. 1 to 4, inclusive, of the drawings, the electric heating appliance 20 there illustrated and incorporating the electric terminal structure embodying the features of the present invention may take the form of an electric range comprising a cooking top 21 which is provided with an annular opening 22 therein that is adapted to receive a movable hot plate or heating unit 23. The heating unit 23 comprises a pair of sheathed electric heating elements 24 and 25 lying in a common plane that is substantially parallel to the cooking top 21. Preferably the heating elements 24 and 25 are constructed in the manner disclosed in United States Patent No. 1,367,341, granted on February 1, 1921, to Charles C. Abbott. As there disclosed each heating element is provided with a coiled resistance conductor 26 housed in a metallic sheath 27 and supported in spaced relation to the sheath 27 by a highly compacted mass of heat conducting and electrical insulating material 28, such as powdered magnesium oxide. The heating elements 24 and 25 are shaped to form flat spirals of several turns having the terminal sections or ends 24a and 25a located at one side of the heating unit and adjacent to a pivoting hinge, described below, attaching the heating unit 23 to the cooking top 21. Each of the terminal sections 24a and 25a extends downwardly and outwardly from the plane of the heating elements 24 and 25. The terminal sections 24a and 25a of the two heating elements 24 and 25 are provided with electric terminals 29 which have their inner ends electrically connected with the resistance conductors 26 and their outer ends protruding a suitable distance from the ends of the sheaths 27 in which they are housed.

The two heating elements 24 and 25 are mounted on a grid 30 provided with arms having notches 31 formed therein in which the heating elements 24 and 25 are received and which are provided with peened-over sections 32 that firmly grip the turns of the heating elements and hold them in their proper relation to each other. The outer ends of the arms of the grid 30 are mounted in a supporting member or ring 33 which is provided with a vertically positioned annular flange 34, the arms of the grid 30 being provided with outwardly projecting tongues 35 at the ends thereof which are received in apertures 36 provided for them in the annular flange 34.

The flange 34 is adapted to be inserted in the opening 22 of the cooking top 21 so as to support the heating elements 24 and 25 in proper cooking position and for this purpose the support or ring 33 is provided with a substantially horizontal annular flange 37 extending outwardly from the upper edge of the annular flange 34 and adapted to overlap the adjacent area of the cooking top 21 disposed about the opening 22. It will be understood that the heating elements 24 and 25 project upwardly about the adjacent upper edges of the grid 30 and also above the high section of the flange 37 so that cooking vessels can be placed upon and in direct thermal contact with the sheaths 27 of the heating elements 24 and 25.

To provide more uniform heat distribution when a cooking vessel is placed upon the heating unit 23 and to protect the individual coils of the heating elements 24 and 25 from permanent distortion, the heating elements are spaced and attached to the grid 30, and otherwise supported, in accordance with the invention disclosed in the copending application of Oliver G. Vogel and Francis E. Kirk, Serial No. 783,986, filed November 4, 1947.

The cooking top 21 is provided with an annular flange 38 depending therefrom and arranged in substantial concentric relation with the annular flange 34 of the support 33 when the heating unit 23 is in the proper cooking position. The diameter of the opening 22 is somewhat larger than the diameter of the flange 34 of the support 33 so that the flange 38 is spaced somewhat from the flange 34. Mounted within the space between the flanges 34 and 38 is one arm 39 of a hinge 40, the arm 39 being adjustably secured to the flange 38 by any suitable arrangement, such, for example, as a screw 41. To provide for vertical adjustment of the heating unit 23 in the opening 22, the hinge arm 39 is provided with an oblong aperture or slot 42 that cooperates with the screw 41. The hinge 40 also comprises a cooperating arm 43 that is fixedly attached to the outer terminal ends 25a of the heating element 25 and slidably attached to the inner terminal ends 24a of the heating element 24. The lower end of the hinge arm 43 is additionally provided with slots 44 to permit the terminal ends 24a and 25a to expand without permanent distortion of the hinge arm 43. The hinge arms 39 and 43 are pivotally attached through a hinge pin 45, an electrical grounding strap 46 formed of flexible and resilient conducting material being fixedly attached to the hinge arms 39 and 43, thereby providing a positive grounding circuit between the heating unit 23 and the cooking top 21 of the appliance 20. Also, the resilient grounding strap 46 biases the heating unit 23 into its normal cooking position, illustrated in Figs. 1 and 2, by virtue of the forces exerted between the hinge arms 39 and 43. The hinge 40 arranged between the heating unit 23 and the cooking top 21 is disposed adjacent to the terminal ends 24a and 25a and directly between the lower surface of the cooking top 21 and the terminal ends 24a and 25a. Preferably, the hinge and grounding strap arrangement above described conforms to the invention disclosed in the copending application of Francis E. Kirk, Serial No. 783,961, filed November 4, 1947.

Positioned under the heating elements 24 and 25 and below the grid 30 and the support 33 is a reflector 47. The reflector 47 is generally parabolic in shape and has at its marginal edge an outwardly extending flange 48 which is mounted on a cooperating inwardly directed flange or seat 49 carried by the depending flange 38. The reflector 47 is provided with a drawn opening 50 adjacent to the center thereof for the purpose of directing therethrough any spillage upon the reflector 47 from cooking vessels, or the like, supported by the heating unit 23. The seat 49 and the reflector 47 are provided respectively with notched sections 53 and 54 through which the terminal sections or ends 24a and 25a of the heating elements 24 and 25 pass downwardly and outwardly to the hinge arm 43.

Finally, the terminal ends 24a and 25a of the heating unit 23 carry terminal structure 60 including an insulating terminal block 61 and a set of three flexible insulated wires 62, the set of insulated wires 62 being connected to a suitable source of current supply, not shown, and preferably respectively to the neutral and to the two outside conductors of a three-wire Edison source that may be 230 volts A. C.

As best shown in Figs. 5 to 9, inclusive, the terminals 29 project outwardly from the terminal ends 24a and 25a and are preferably formed of steel, the terminals 29 being retained in centered positions within the ends of the sheaths 27 by cooperating surrounding insulators 63 formed of porcelain, or the like. The terminal 29 carried by one of the terminal ends 25a of the heating element 25 and the terminal 29 carried by the adjacent terminal end 24a of the heating element 24 are electrically connected together by a resilient clip 64 rigidly secured thereto. The other terminals 29 carried by the terminal ends 24a and 25a of the heating elements 24 and 25 have resilient clips 65 and 66 respectively rigidly secured thereto, the clips 65 and 66 being substantially identical. Preferably, the clips 64, 65 and 66 are formed of hard-rolled low-carbon steel strip, the steel strip being cold rolled to produce both hardness and resiliency, whereby the clips 64, 65 and 66 possess a considerable spring characteristic. After the clips 64, 65 and 66 are thus formed, they are preferably cleaned and given an interior nickel plating of appropriate thickness and then given an exterior plating of silver of appropriate thickness in order to insure a low electrical resistance between the clips and the bared ends of the insulated wires 62 which may be formed of ordinary copper, or the like, and provided with matted insulating coverings that may advantageously contain an asbestos filler. Preferably, the clip 64 is directly spot welded to the adjacent terminals 29, and the clips 65 and 66 are directly spot welded to the respective terminals 29, whereby the clips 64, 65 and 66 are rigidly supported and carried by the terminals 29 that are also of rigid strong construction upon the terminal ends 24a and 25a of the heating unit 23.

Preferably, the insulating terminal block 61 is formed in one piece by a suitable molding operation and comprises an appropriate insulating material normally containing an asbestos filler. The plastic material sold under the trade name "Cold Molded" has been found to be very advantageous as an insulating material for the purpose of molding the terminal block 61, although "Bakelite" and like plastic materials are suitable for this purpose. In fact, the terminal block 61 may be formed of porcelain, although the moldable plastics mentioned have been found to be more advantageous in manufacture and easier to assemble into the terminal structure 60. The terminal block 61 is of one-piece molded construction as noted above having three spaced-apart cavities 71, 72 and 73 formed in the body thereof between the upper and lower walls 74 and 75 thereof and having respectively communicating slots 81, 82 and 83 molded therein through the upper wall 74. The cavities 71, 72 and 73 open through a rear wall 76 of the terminal block 61 and terminate short of a front wall 77 thereof; and preferably the openings into the cavities 71, 72 and 73 through the front wall 76 are provided with rounded corners in order to facilitate insertion of the respective clips 64, 65 and 66 therethrough as explained more fully below. Also, the slots 81, 82 and 83 formed through the upper wall 74 of the terminal block 61 and respectively communicating with the cavities 71, 72 and 73 are forwardly tapered for the purpose of gripping the matted insulating coverings provided on the wires 62.

Each of the clips 64, 65 and 66 includes a lower body portion and an upper reverse bent wing portion providing cooperating jaws, an opening being formed in the bend between the body portion and the wing portion. As illustrated in Fig. 6 the clip 66 comprises the lower body portion 66a and the upper reverse bent wing portion 66b providing the pair of cooperating jaws 66c; and the opening 66d is formed in the bend between the portion 66a and 66b. The opening 66d is adapted to receive the bared end of the associated insulated wire 62, and the pair of cooperating jaws 66c is adapted to bite into and firmly to clamp in place the bared end on associated insulated wire 62. As best shown in Fig. 8, each of the cavities 71, 72 and 73 comprises a series of steps for the purpose of receiving the projecting terminals 29 and clips 64, 65 and 66; and specifically, the cavity 73 comprises the three steps 91, 92 and 93 that are adapted respectively to receive the end of the sheath 27 of the associated terminal end 25a, the terminal 29 and the clip 66. In each of the cavities 71, 72 and 73 the surface of the step disposed adjacent to the front wall 77 cooperates with a surface provided therein for the purpose of forcing the associated clip into its clamping position with respect to the bared end of the associated insulated wire 62. For example, in the cavity 73 the surface of the step 93 adjacent to the front wall 77 cooperates with the surface 94 provided therein for the purpose of forcing the associated clip 66 into its clamping position with respect to the bared end of the associated insulated wire 62.

After the heating unit 23 has been formed, the clips 64, 65 and 66 are suitably welded to the terminals 29 as explained above, whereby the heating unit 23 is assembled into its final position in the electric heating appliance 20. Thereafter the appropriate set of insulated wires 62 in the appliance 20 that is to be connected to the heating unit 23 is prepared merely by skinning back the ends of the braided covering and then scraping or otherwise cleaning the exposed or bared ends of the copper wires. The appropriate three bared ends of the insulated wires 62 are then inserted through the holes provided in the ends of the clips 64, 65 and 66 so that the bared ends of the insulated wires 62 project between the body portions and the wing portions of the clips, as clearly shown in Fig. 6. At this time the terminal block 61 is placed upon the assembly merely by insertion of the clips 64, 65 and 66 into the openings provided in the rear wall 76 communicating with the respective cavities 71, 72 and 73. The terminal block 61 is then pushed forwardly toward the terminal ends 24a and 25a and toward the hinge arm 43, whereby the clips 64, 65 and 66 riding between the opposed upper and lower surfaces provided in the cavities 71, 72 and 73 are forced into their clamping positions. Specifically, the lower and upper surfaces 93 and 94 within the cavity 73 respectively engaging the body portion 66a and the wing portion 66b of the clip 66 forces the clip 66 into its clamping position, whereby the associated bared end of the insulated wire 62 is securely and firmly clamped between the jaws 66c provided on the body portion 66a and the wing portion 66b of the clip 66 in order to establish a good electrical contact therebetween and firmly to clamp in place the terminal block 61. When the terminal block 61 has been forced rearwardly toward the hinge arm 43 into its final position, illustrated in Figs. 7 and 8, the three electrical connections between the clips 64, 65 and 66 and the respective three insulated wires 62 are perfected and the terminal block 61 is supported and restrained in place.

Accordingly, the terminal block 61 is of the quick-attachable type and is supported and retained in place without screws or other fixtures and perfects the electrical connections between the bared ends of the insulated wires 62 and the clips 64, 65 and 66 without the utilization of screws or other fixtures. Thus, it will be appreciated that the improved terminal structure 60 is both economical to manufacture and to assemble without the use of special jigs or other exterior screws or securing fixtures. Further, it will be understood that in the event repair of the heating unit 23 is required in the field that a serviceman may readily disconnect the heating unit 23 from the set of three insulated wires 62 merely by forcing the terminal block 61 forwardly away from the hinge arm 43 and then withdrawing the bared ends of the insulated wires 62 from the associated clips 64, 65 and 66.

Also it is noted that since the slots 81, 82 and 83 are forwardly tapered toward the front wall 77 of the terminal block 61, the matted coverings on the wires 62 are frictionally engaged and securely wedged or clamped in position when the terminal block 61 is forced into its final position, as illustrated in Figs. 7 and 8, thereby reducing and substantially eliminating stress upon the electrical connections established between the bared ends of the insulated wires 62 and the clips 64, 65 and 66. Moreover, the slots 81, 82 and 83 gripping the matted coverings on the wires 62 support the wires 62 upon the terminal block 61 and prevent rotation or twisting thereof incident to movement of the terminal block 61 with the heating unit 23. This arrangement is particularly advantageous in the appliance 20 since the heating element 23 is of the raisable type and is frequently hinged upwardly about the hinge pin 45 when it is necessary to clean or remove the reflector 47. This movement of the heating element 23 between its raised position and its normal cooking position, respectively illustrated in Figs. 1 and 4, is not transmitted to the electrical connections established between the bared ends of the insulated wires 62 and the clips 64, 65 and 66 due to the gripping action between the terminal block 61 and the matted coverings provided on the wires 62. In other words, the insulating block 61 is rigidly supported by the rigid end terminals 24a and 25a of the heating unit 23 and is movable therewith, this movement being accommodated by the flexibility of the insulated wires 62 preventing the electrical connections between the insulated wires 62 and the clips 64, 65 and 66 from working loose.

In Figs. 10 and 11 a modification in the terminal structure 60 is illustrated in that the clip 100 shown therein and corresponding to the identical clips 65 and 66 is provided with two spurs 101 carried by the corners of the reverse bent wing portion 102 thereof. The clip 100 is otherwise identical to the clips 65 and 66; and it will be understood a clip of the general construction of the clip 64 may also be formed in a substantially identical manner when the spur construction is desired. The provision of the spurs 101 upon the wing portion 102 of the clip 100 further increases the friction between the opposed clamping surfaces provided in the cavity of the terminal block 61 receiving the clip 100; and specifically the spurs 101 dig into the plastic insulating material of which the block 61 is formed thereby insuring positive locking of the terminal block 61 in place. Ordinarily this modification employing the spurs on the clips is not required; however, in the event the appliance 20 is subject to considerable vibration this modification may be advantageously employed as it materially increases the friction between the parts noted and positively prevents the terminal block 61 from working loose notwithstanding the vibration noted. However, in passing it is noted that the wings of the clips 64, 65, and 66 dig into the adjacent clamping surfaces of the terminal block 61, even in the absence of the spurs, in order to produce to some extent the locking action above described.

Of course, it will be understood that the insulating terminal block 61 not only serves the purposes of completing the electrical connections above described and of securely anchoring the insulated wires 62 in place, but it also protects the electrical connections against accidental short-circuits and further protects the electrical connections against spillage of foreign materials thereupon from cooking vessels supported by the heating unit 23. The hinge arm 43 also serves as a drip shield that cooperates with the terminal block 61 in order to prevent contamination of the electrical connections and the insulated wire 62 by spillage.

In view of the foregoing considerations it is apparent that there has been provided an improved electric terminal structure of simple and economical construction and arrangement.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Electric terminal structure comprising a first set of rigid end terminals, a plurality of insulated flexible electric wires provided with a second set of end terminals, a set of resilient clips rigidly secured to one of said sets of end terminals and clamping the other of said sets of end terminals, a one-piece hollow insulating quick-attachable terminal block supported by said first set of end terminals and enclosing both of said sets of end terminals and said set of clips, and means including two opposed sets of clamping surfaces provided within said terminal block and frictionally engaging the opposite sides of said set of clips for securely holding said terminal block in place and for restraining said set of clips in clamped engagement with said other set of end terminals in order to establish good electrical connections therebetween.

2. Electric terminal structure comprising a first set of rigid end terminals, a plurality of insulated flexible wires the ends of which are bared to provide a second set of end terminals, a set of resilient clips rigidly secured to one of said sets of end terminals and clamping the other of said sets of end terminals, a one-piece hollow insulating quick-attachable terminal block supported by said first set of end terminals and enclosing both of said sets of end terminals and said set of clips, means including two opposed sets of clamping surfaces provided within said terminals block and frictionally engaging the opposite sides of said set of clips for securely holding said terminal block in place and for restraining said set of clips in clamped engagement with said other set of end terminals in order to establish good electrical connections therebetween, and means including a plurality of slots formed in said terminal block receiving and frictionally engaging the ends of said insulated wires adjacent to said second set of end terminals for securing said insulated wires to said terminal block in order to reduce stress upon said electrical connections in the event of relative movement between said terminal block and said insulated wires.

3. Electric terminal structure comprising a first set of rigid end terminals, a plurality of insulated flexible wires the ends of which are bared to provide a second set of end terminals, a set of resilient clips rigidly secured to said first set of end terminals and clamping said second set of end terminals, a one-piece hollow insulating quick-attachable terminal block supported by said first set of end terminals and enclosing both of said sets of end terminals and said set of clips, means including two opposed sets of clamping surfaces provided within said terminal block and frictionally engaging the opposite sides of said set of clips for securely holding said terminal block in place and for restraining said set of clips in clamped engagement with said second set of end terminals in order to establish good electrical connections therebetween, and means including a plurality of slots formed in said terminal block receiving and frictionally engaging the ends of said insulated wires adjacent to said second set of end terminals for securing said insulated wires to said terminal block in order to reduce stress upon said electrical connections in the event of relative movement between said terminal block and said insulated wires.

4. Electric terminal structure comprising a support, a set of terminals carried by said support, a set of resilient clips rigidly secured to said set of terminals, each of said clips being provided with a body and a return bent wing disposed in spaced relation thereto and having an opening in the bend between the body and the wing thereof, a set of insulated flexible wires the ends of which are bared and positioned in the openings provided in said clips between the bodies and the wings thereof, a one-piece hollow insulating quick-attachable terminal block supported by said set of terminals and enclosing said set of terminals and said set of clips and the bared ends of said set of insulated wires, means including two opposed sets of clamping surfaces provided within said terminal block and frictionally engaging the bodies and the wings of said set of clips for securely holding said terminal block in place and for bending the wings of said clips toward the bodies thereof in order to clamp the bared ends of said insulated wires therebetween in good electrical contact therewith, and means including a set of slots formed in said terminal block receiving and frictionally engaging the ends of said set of insulated wires adjacent to the bared ends thereof for securing said set of insulated wires to said terminal block in order to reduce stress upon said electrical contact in the event of relative movement between said terminal block and said set of insulated wires.

5. Electric terminal structure comprising a support, a terminal carried by said support, a resilient clip provided with a body rigidly secured to said terminal and a return bent wing disposed in spaced relation to the body thereof, an insulated flexible wire the end of which is bared and positioned between the body and the wing of said clip, a one-piece hollow insulating quick-attachable terminal block supported by said terminal and enclosing said terminal and said clip and the bared end of said insulated wire, said terminal block being provided with opposed front and rear walls and a joining wall extending therebetween, the rear wall of said terminal block having a hole therein adapted slidably to receive said clip, means including two opposed clamping surfaces provided within said terminal block adjacent to the hole in the rear wall thereof and frictionally engaging the body and the wing of said clip for securely holding said terminal block in place and for bending the wing of said clip toward the body thereof in order to clamp the bared end of said insulated wire therebetween in good electrical contact therewith, and means including a tapered slot formed in the joining wall of said terminal block receiving and frictionally engaging the end of said insulated wire adjacent to the bared end thereof for securing said insulated wire to said terminal block in order to reduce stress upon said electrical contact in the event of relative movement between said terminal block and said insulated wire, the slot formed in the joining wall of said terminal block opening into the hole in the rear wall thereof so that said terminal block may be readily slid in place upon said clip after the bared end of said insulated wire is positioned between the body and the wing of said clip.

6. The electric terminal structure set forth in claim 5, wherein the body and the wing of said clip carry opposed jaws that bite into the bared end of said insulated wire.

7. The electric terminal structure set forth in claim 5, wherein said clip is formed of hard-rolled low-carbon steel provided with an inner nickel coating and an outer silver coating.

8. The electric terminal structure set forth in claim 5, wherein said terminal is formed of steel, and said resilient clip is formed of hard-rolled low-carbon steel, and said terminal and said resilient clip are welded together.

9. The electric terminal structure set forth in claim 5, wherein the wing of said clip carries one or more spurs frictionally engaging the adjacent clamping surface provided within said terminal block.

ROBERT J. SUTTON.

REFERENCES CITED

The following references are of record in the file of this patent:

UNITED STATES PATENTS

| Number | Name | Date |
|---|---|---|
| 908,389 | Briggs | Dec. 29, 1908 |
| 2,274,348 | Sharp | Feb. 24, 1942 |
| 2,445,604 | Clayton | July 20, 1948 |